United States Patent Office 3,819,722
Patented June 25, 1974

3,819,722
2-PHENYL-1,1-DIHALO-ALKANE-2-OLS
Daniel Bertin, Montrouge, and Jacques Perronnet and André Teche, Paris, France, assignors to Roussel-UCLAF, Paris, France
No Drawing. Filed Dec. 31, 1969, Ser. No. 889,711
Claims priority, application France, Jan. 7, 1969, 6900090
Int. Cl. C07c *31/16*
U.S. Cl. 260—618 D                    12 Claims

ABSTRACT OF THE DISCLOSURE

Halogenated compounds of formula I

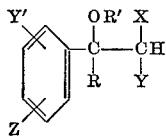
(I)

wherein R represents a lower alkyl radical, saturated or not, X is chlorine or bromine, Z is chlorine or bromine, Y' is hydrogen, chlorine, bromine lower alkyl or nitro group, R' is hydrogen, acyl, alkyl sulfonyl or aryl sulfonyl, which possess pesticidal properties, process for their preparation, pesticidal compositions containing them, and their use.

THE PRIOR ART

Belgian Pat. No. 717,863 discloses 1-phenyl-2,2-dihalogenoethanol compounds which are useful as pesticidal agents.

OBJECTS OF THE INVENTION

It is an object of the invention to provide the novel halogenated compounds of formula I.

It is another object of the invention to provide processes for the preparation of the halogenated compounds of formula I.

It is a further object of the invention to provide novel pesticidal compositions.

It is an additional object of the invention to provide a novel method for controlling harmful plants and/or insects.

These and other objects and advantages of the invention will become obvious from the following detailed description.

THE INVENTION

The invention relates to novel halogenated compounds of the general formula

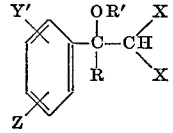

wherein R is selected from the group consisting of a lower alkyl radical and an unsaturated lower alkyl radical, X is selected from the group consisting of a chlorine atom and a bromine atom, Z is selected from the group consisting of a chlorine atom and a bromine atom, Y' is selected from the group consisting of a hydrogen atom, a chlorine atom, a bromine atom, a lower alkyl radical and a nitro group, R' is selected from the group consisting of a hydrogen atom, an acyl radical, an alkyl sulfonyl radical and an aryl sulfonyl radical.

The term "acyl" used above denotes preferably the residue of an organic carboxylic acid comprising 1 to 18 carbon atoms, substituted or not, saturated or not, such as the residues of formic, acetic, propionic, butyric, valeric, acrylic, methacrylic, trichloroacrylic, monochloroacetic, or *t*-butylacetic acids, or the residue of an aromatic acid comprising 7 to 9 carbon atoms, which may be substituted, for example by lower alkyl groups, such as methyl, by nitro groups, or by halogen atoms, such as chlorine, e.g. benzoyl, chlorobenzoyl, nitrobenzoyl or toluoyl. The term "alkylsulfonyl" used above denotes preferably the residue of an alkylsulfonic acid comprising 1 to 3 carbon atoms, such as mesyl. The term "arylsulfonyl" used above denotes preferably the residue of an arylsulfonic acid comprising 6 to 9 carbon atoms, which may be substituted, for example, by lower alkyl groups or halogen atoms such as phenylsulfonyl, tolylsulfonyl or *p*-chlorophenylsulfonyl. The substituent R, mentioned above, denotes preferably an alkyl radical, saturated or not, comprising 1 to 7 carbon atoms, such as methyl, ethyl, propyl, isopropyl, *n*-butyl, *t*-butyl, pentyl, hexyl, heptyl, vinyl, allyl or ethynyl. The substituent Y', mentioned above, denotes, when it represents a lower alkyl radical, preferably an alkyl radical comprising 1 to 4 carbon atoms, such as methyl, ethyl, propyl, isopropyl, *n*-butyl or *t*-butyl.

The compounds of formula I, possess remarkable pesticidal, specifically herbicidal and insecticidal properties, which makes them particularly useful in the agricultural field for controlling harmful plants and insects.

Among the preferred compounds are the compounds of the formula

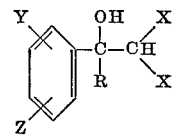

in which R is selected from the group consisting of a lower alkyl radical and an unsaturated lower alkyl radical, X is selected from the group consisting of a chlorine atom and a bromine atom,
Y is selected from the group consisting of a hydrogen atom, a chlorine atom and a bromine atom, Z is selected from the group consisting of a chlorine atom and a bromine atom.

Among the preferred compounds of formula I, one can mention especially the following compounds:

2-(2',5'-dichlorophenyl)-3,3-dichloro-propane-2-ol,
2-(*p*-chlorophenyl)-3,3-dichloro-propane-2-ol,
2-(*p*-bromophenyl)-3,3-dichloro-propane-2-ol,
2-(ortho-bromophenyl)-3,3-dichloro-propane-2-ol,
2-(2',4'-dichlorophenyl)-3,3-dichloro-propane-2-ol,
3-(*p*-chlorophenyl)-4,4-dichloro-1-butyne-3-ol,
3-(2',5'-dichlorophenyl)-4,4-dichloro-1-butyne-3-ol,
2-(2'-chloro-5'-methylphenyl)-3,3-dichloro-propane-2-ol,
2-(2'-methyl-5'-chlorophenyl)-3,3-dichloro-propane-2-ol,
2-(3'-nitro 4'-chlorophenyl)-3,3-dichloro-propane-2-ol,
2-(*p*-chlorophenyl)-3,3-dichloro-propane-2-ol acetate,
2-(2',5'-dichlorophenyl)-3,3-dichloro-propane-2-ol
   acetate, and
2-(2',5'-dichlorophenyl)-3,3-dichloro-propane-2-ol
   tosylate.

The process of the invention for the preparation of the compounds of formula I comprises condensing a 2,2-dihalogenoacetophenone of the formula:

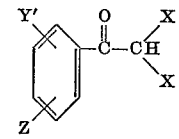
(II)

wherein X, Y' and Z have the above-mentioned meaning, with an organometallic derivative whose organic radical is R as defined above, thereby obtaining a compound of formula I wherein R' is hydrogen, and optionally esterifying the latter by means of an esterifying agent.

Preferably, the process of the invention is carried out as follows:

the organometallic derivative comprising a lower alkyl radical (R), saturated or not, is preferably a Grignard reagent, namely an RMg halide, such as bromide or iodide, or an R-lithium;

the condensation of the organometallic derivative with the ketone is effected preferably in an ether such as ethyl ether or tetrahydrofuran;

decomposition of the metallic complex, obtained after condensation with the Grignard reagent, is effected according to the usual methods, either with water or with a solution of ammonium chloride;

the esterifying agent is selected from the group consisting of an alkylsulfonic acid halide, an arylsulfonic acid halide, a lower aliphatic acid, an aromatic acid and a functional derivative of these acids, such as an anhydride, a mixed anhydride, a halide or a metallic salt;

esterification by means of an aliphatic acid, an aromatic acid or a functional derivative of these acids is effected advantageously in the presence of a dehydrating agent, such as p-toluenesulfonic acid;

esterification by means of an alkyl- or arylsulfonic acid halide is preferably effected on the alkali-metal alcoholate, such as sodium or potassium alcoholate, derived from the alcohol of formula I (R'=H).

The starting products, 2,2-dihalogenoacetophenones, of formula II, can be prepared, according to the reaction of Friedel and Crafts, by reacting the dihalogenoacetyl chloride, ClCOCHX$_2$, with an aromatic derivative of formula III:

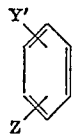

(III)

X, Y' and Z keeping the afore-mentioned meanings.

2,2-Dihalogenoacetophenones, of formula II, can likewise be prepared by the action of a halogen, X, on a substituted derivative of acetophenone, of formula IV:

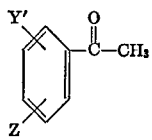

(IV)

X, Y' and Z keeping the afore-mentioned meanings, the ketones IV being themselves obtained, according to the reaction of Friedel and Crafts, specifically by reacting acetyl chloride on an automatic derivative of formula III.

Examples of preparing 2,2-dihalogenoacetophenones appear in Belgian Pat. No. 717,863.

Two examples of such preparations are given further on, in the experimental part of the description.

A particular compound corresponding to the general formula I, 2-(3'-nitro-4'-chlorophenyl)-3,3-dichloro-propane-2-ol, can also be obtained by reacting p-chloro-2,2-dichloro-acetophenone with a methyl magnesium halide, esterifying the resulting 2-(p-chlorophenyl)-3,3-dichloro-propane-2-ol into the corresponding acetate, subjecting the latter to a nitration agent, and recovering the desired product.

The compositions of the invention are herbicidal and/or insecticidal compositions containing, as active material, one or several compounds of general formula I and an adjuvant.

They contain in general from 10 to 80% by weight thereof, preferably from 10 to 50% by weight, of active material, together with said adjuvant.

These compositions can be in the form of powders, granules, suspensions, emulsions, solutions, containing the active principle, for example in mixture with a vehicle and/or surface-active anionic, cationic or non-ionic agent ensuring, among other things, a uniform dispersion of the substances of the composition. The vehicle used can be a liquid such as water, alcohol, hydrocarbons or other organic solvents, a mineral, animal or vegetable oil, or a powder such as talcum, clays, silicates, Kieselguhr.

The solid compositions, appearing in the form of powder for dusting, of wettable powders or of granules, can be prepared by crushing the active compound with an inert solid substance or by impregnation of the solid support with a solution of the active principle in a solvent which one then evaporates.

In addition to a vehicle or surface-active agent, and one or several compounds of formula I, these compositions can also contain other pesticides, herbicides and/or fungicides, biocides, insecticides, etc., and substances having properties influencing plant growth.

The compositions of the invention are of course applied at doses sufficient to exert their pesticidal, specifically herbicidal and/or insecticidal activities. The doses of active matter in the compositions vary specifically as a function of the plants and/or insects to be destroyed, the nature of the ground and the atmospheric conditions.

The pesticidal control method of the invention, specifically herbicidal and/or insecticidal control, comprises applying a pesticidally effective amount of at least one compound of formula I, in order to combat harmful organisms, specifically harmful plants and insects. The said method is preferably performed by using the compounds of formula I in the form of a composition as defined above.

The following examples illustrate the invention without however limiting it.

PREPARATION 1

2',5'-dichloro-2,2-dichloroacetophenone

One heats at 85° C. a mixture of 400 g. of p-dichlorobenzene and 600 g. of aluminum chloride, adds progressively thereto 588 g. of dichloroacetyl chloride, brings the temperature of the reaction medium to +110° C. and keeps this temperature for four hours. One pours the reaction solution into a mixture of water, ice and hydrochloric acid, extracts the aqueous acid phase with ethyl ether, eliminates the solvent by distillation, redistills the residue and obtains 355 g. of 2',5'-dichloro-2,2-dichloroacetophenone, b.p.=137° C., under 3 mm. of mercury.

This compound is described by Stepanov, Zhur. Org. Khim., 2(5) 934 (1966).

PREPARATION 2 p- and ortho-bromo-2,2-dichloroacetophenone

One introduces, in 30 minutes, 74 g. of dichloroacetyl chloride into a mixture of 78.5 g. of bromo-benzene and 73 g. of aluminum chloride. One then heats the mixture at 100° C. for two hours, then after cooling one pours it on a mixture of water, ice and hydrochloric acid, extracts the aqueous acid phase with methylene chloride, eliminates the solvent by distillation, redistills the residue and obtains 94 g. of a mixture of p-bromo-2,2-dichloroacetophenone and of ortho-bromo-2,2-dichloroacetophenone, b.p.=103°-104° C., under 0.3 mm. of mercury.

These two compounds can be separated, if desired, by usual methods.

EXAMPLE I 2-(2',5'-dichlorophenyl)-3,3-dichloropropane-2-ol

Into 160 cc. of a solution cooled to −10° C. of methylmagnesium bromide in ethyl ether, containing 1.25 mole/litre, one introduces, at −10° C., in about forty-five minutes, a solution of 51.6 g. of 2',5'-dichloro-2,2- dichloroacetophenone in 80 cc. of ethyl ether, lets the reaction mixture return slowly to 20° C., then agitates it for one hour at this temperature, introduces thereinto an aqueous saturated solution of ammonium chloride, separates the organic phase by decanting, washes it with an aqueous solution of ammonium chloride, dries it and concentrates it to dryness under reduced pressure. The resulting crude product (30 g.) is redistilled under vacuum and one thus obtains 18 g. of 2-(2′,5′-dichlorophenyl)-3,3-dichloropropane-2-ol, b.p.=94° C., under 0.2 mm. of mercury.

Analysis: $C_9H_8Cl_4O$=237.98. Calculated: C, 39.45%; H, 2.94%; Cl, 51.76%. Found: C, 39.2%; H, 3.0%; Cl, 51.6%.

As far as is known, this compound is not described in the literature.

EXAMPLE II 2-(p-chlorophenyl)-3,3-dichloropropane-2-ol

Into 100 cc. of a solution of methylmagnesium iodide in ethyl ether, cooled to −10° C., titrating 2 mole/litre, one introduces, in about one hour, a solution of 37.5 g. of p-chloro-2,2-dichloroacetophenone (described in J. Chem. Soc. 1949, 203) in 120 cc. of ethyl ether, then lets the reaction mixture return to room temperature, then agitates it for twenty hours, introduces thereinto an aqueous saturated solution of ammonium chloride, separates the organic phase by decanting, washes it with an aqueous solution of ammonium chloride, dries it and concentrates it to dryness under reduced pressure. The resulting crude product (25 g.) is redistilled in vacuo and one thus obtains 17.3 g. of 2-(p-chlorophenyl)-3,3-dichloropropane-2-ol, b.p.=93° C., under 0.2 mm. of mercury.

Analysis: $C_9H_9Cl_3O$=239.53. Calculated: C, 45.12%; H, 3.79%; Cl, 44.40%. Found: C, 45.6%; H, 3.9%; Cl, 44.40%.

As far as is known, this compound is not described in the literature.

EXAMPLE III 2-(p-bromophenyl)-3,3-dichloropropane-2-ol and 2-(ortho-bromophenyl)-3,3-dichloropropane-2-ol In a manner analogous to that described in example II, starting from 55 g. of a mixture of p-bromo-2,2-dichloroacetophenone and ortho-bromo-2,2-dichloroacetophenone, one obtains 35 g. of a mixture of 2-(p-bromophenyl-3,3-dichloropropane-2-ol and 2 - (ortho-bromophenyl)-3,3-dichloropropane-2-ol, b.p.=97° C., under 0.2 mm. of mercury.

Analysis: $C_9H_9BrCl_2O$=283.98. Calculated: C, 38.06%; H, 3.19%; Br, 28.14%; Cl, 24.97%. Found: C, 38.1%; H, 3.2%; Br, 28.0%; Cl, 24.5%.

This mixture can be separated into its two constituents by the usual methods.

These compounds are not described in the literature.

It is likewise possible to obtain the said two compounds starting respectively from p-bromo-2,2-dichloroacetophenone and ortho-bromo-2,2 - dichloroacetophenone.

EXAMPLE IV 2-(2′,4′-dichlorophenyl)-3,3-dichloropropane-2-ol

Starting from 30 g. of 2′,4′-dichloro-2,2-dichloroacetophenone (described in Belgian Pat. No. 717,863), and using the procedure described in example II, one obtains 25.5 g. of 2-(2′,4′-dichlorophenyl)-3,3-dichloropropane-2-ol, b.p.: 96° C., under 0.1 mm. of mercury.

Analysis: $C_9H_8Cl_4O$=273.98. Calculated: C, 39.45%; H, 2.94%; Cl, 51.76%. Found: C, 39.3%; H, 3.0%; Cl, 52.0%.

This compound is not described in the literature.

EXAMPLE V 3-(p-chlorophenyl)-4,4-dichloro-1-butyne-3-ol

Into 550 cc. of a solution of ethynylmagnesium bromide in tetrahydrofuran containing 0.575 mole of ethynylmagnesium bromide [prepared according to the method described by L. Govin (Annales de Chimie, 5, 1960, 535, 13 ème série)], one introduces at ambient temperature while bubbling in acetylene, in about one hour, a solution of 33.5 g. of p-chloro-2,2-dichloroacetophenone in 35 cc. of tetrahydrofuran, keeps bubbling in acetylene for thirty minutes, then agitates the reaction mixture for sixteen hours, introduces thereinto a saturated aqueous solution of ammonium chloride, separates the organic phase by decanting, washes it with an aqueous solution of sodium chloride, dries it and concentrates it to dryness under reduced pressure.

The resulting crude product (39 g.) is chromatographed over silica gel and eluted with benzene.

One thus obtains 19 g. of 3-(p-chlorophenyl)-4,4-dichloro-1-butyne-3-ol.

A sample of this compound is redistilled in vacuo, b.p.=100° C., under 0.1 mm. of mercury.

Analysis: $C_{10}H_7Cl_3O$=249.52. Calculated: C, 48.13%; H, 2.82%; Cl, 42.63%. Found: C, 48.0%; H, 2.9%, Cl, 42.3%.

As far as is known, this compound is not described in the literature.

EXAMPLE VI 3-(2′,5′-dichlorophenyl)-4,4-dichloro-1-butyne-3-ol

By a method analogous to that described in example V, one prepared, starting from 25 g. of 2′,5′-dichloro-2,2-dichloroacetophenone, 17.5 g. of 3-(2′,5′-dichlorophenyl)-4,4-dichloro-1-butyne-3-ol, m.p.=57° C. (crystallized from petroleum ether).

Analysis: $C_{10}H_6Cl_4O$=283.97. Calculated: C, 42.29%; H, 2.13%; Cl, 49.95%. Found: C, 42.1%; H, 2.2%; Cl, 50.2%.

As far as is known, this compound is not described in the literature.

EXAMPLE VII 2-(p-chlorophenyl)-3,3-dichloropropane-2-ol-acetate

One leaves a mixture of 89.6 g. of 2-(p-chlorophenyl)-3,3-dichloropropane-2-ol, 900 cc. of acetic anhydride and 51 g. of p-toluenesulphonic acid at rest for sixteen hours. One then pours the mixture thus obtained into water, decants the organic phase and washes it with water, takes it up with chloroform, dries it and evaporates the solvent in vacuo. One recrystallizes the residue from isopropyl ether and obtains 56 g. of 2-(p-chlorophenyl)-3,3-dichloropropane-2-ol acetate, melting at 70° C.

As far as is known, this compound is not described in the literature.

EXAMPLE VIII 2-(2′,5′-dichlorophenyl)-3,3-dichloropropane-2-ol acetate

By a method analogous to that described in example VII starting from 40.5 g. of 2-(2′,5′-dichlorophenyl)-3,3-dichloropropane-2-ol, one prepares 28 g. of 2-(2′,5′-dichlorophenyl)-3,3-dichloropropane-2-ol acetate, melting at 122° C.

Analysis: $C_{11}H_{10}Cl_4O_2$=316.01. Calculated: C, 41.81%; H, 3.20%; Cl, 44.88%. Found: C, 41.7%; H, 3.3%; Cl, 45.1%.

As far as is known, this compound is not described in the literature.

EXAMPLE IX 2-(2′,5′-dichlorophenyl)-3,3-dichloropropane-2-ol-tosylate

One introduces in fifteen minutes 5 g. of 50% sodium hydride in oil into a solution of 27 g. of 2-(2′,5′-dichlorophenyl)-3,3-dichloropropane-2-ol in 300 cc. of tetrahydrofuran.

One then takes the mixture to reflux for thirty minutes, then introduces thereinto 19 g. of p-toluenesulphonic acid chloride. One maintains reflux for two more hours, leaves to cool, dilutes in ether and pours into water; one decants the organic phase, dries it and evaporates the solvents *in vacuo*. One redistills the residue and obtains 30 g. of 2-(2',5'-dichlorophenyl)-3,3-dichloropropane-2-ol, b.p.=78° C., under 0.5 mm. of mercury.

*Analysis:* $C_{16}H_4Cl_4O_3S$=428.16. Calculated: C, 44.88%; H, 3.30%; Cl, 33.13%; S, 7.49. Found: C, 44.3%; H, 3.3%; Cl, 33.3%; S, 7.2%.

As far as is known, this compound is not described in the literature.

EXAMPLE X 2-(2'-chloro 5'-methylphenyl)-3,3-dichloro propane-2-ol and 2 - (2'-methyl 5'-chlorophenyl)-3,3-dichloropropane-2-ol Into 200 cc. of a solution of methylmagnesium iodide in ethyl ether, cooled to −10° C., containing 1 mole/litre, one introduces, in about forty-five minutes, a solution of a mixture of 35 g. of 2'-chloro-5'-methyl-2,2-dichloro-acetophenone and 2'-methyl-5'-chloro-2,2-dichloro-acetophenone (prepared according to the method described in French Pat. No. 1,550,129) in 50 cc. of ethyl ether, then lets the reaction mixture return to room temperature, one agitates it for one hour, introduces thereinto a saturated aqueous solution of ammonium chloride, separates the organic phase by decanting, washes it with water, dries it and concentrates it to dryness under reduced pressure. The resulting crude product (40 g.) is redistilled *in vacuo* and one thus obtains 22 g. of the mixture of 2-(2'-chloro 5'-methylphenyl)-3,3-dichloropropane-2-ol and 2-(2'-methyl-5'-chlorophenyl)-3,3-dichloropropane-2-ol, b.p.=95° C., under 0.3 mm. of mercury.

*Analysis:* $C_{10}H_{11}Cl_3O$=253.56. Calculated: C, 47.38%; H, 4.38%; Cl, 41.96%. Found: C, 47.6%; H, 4.4%; Cl, 41.7%.

The two isomers can be separated by the usual methods.

As far as is known, these two compounds are not described in the literature.

One can also separate the two starting isomeric dichloroacetophenones by the usual methods and effect, on each of them, separately, an alkylation such as described above.

EXAMPLE XI 2-(3'-nitro-4'-chlorophenyl)-3,3-dichloro-propane-2-ol

Into 400 cc. of fuming nitric acid cooled to −10° C., one introduces under agitation, in about thirty minutes, a solution of 45.7 g. of 2-(p-chlorophenyl)-3,3-dichloropropane-2-ol-acetate (described in example VII) in 45 cc. of acetic anhydride, then leaves the reactive mixture at ambient temperature and agitates it for three hours. One then pours over ice and takes up with chloroform. One washes the organic phase with water, dries it and concentrates it to dryness under reduced pressure.

The resulting crude product (40 g.) is chromatographed over silica gel and eluted with a benzene-ethyl acetate mixture (9/1). One thus obtains 24 g. of 2-(3'-nitro-4'-chlorophenyl)-3,3-dichloropropane-2-ol.

A sample of the compound is redistilled *in vacuo*, b.p.=158° C., under 0.4 mm. of mercury.

*Analysiss* $C_9H_8Cl_3NO_3$=284.53. Calculated: C, 37.99%; H, 2.83; Cl, 37.39%; N, 4.92%. Found: C, 37.6%; H, 2.9%; Cl, 37.2%; N, 4.8%.

As far as is known, this compound is not described in the literature.

EXAMPLE XII

Preparation of a composition to be atomized

One mixes and one crushes very finely ten parts of active product of formula I with 90 parts of talc. The composition thus obtained can be applied with the usual spraying devices.

Following said procedure, a composition comprising 3 - (2',5' - dichlorophenyl) - 4,4 - dichloro - 1 - butyne-3-ol as active material was obtained under the form of a very fine powder.

EXAMPLE XIII

Preparation of an emulsifiable concentrate

One mixes the following ingredients intimately until a liquid homogeneous concentrate is obtained:

| | Parts |
|---|---|
| Active product of formula I | 10 |
| Atlox 4851* | 6.4 |
| Atlox 4855** | 3.2 |
| Xylene | 80.4 |

*Mixture of alkylarylsulfontate and polyoxyethylenated triglyceride; viscosity at 25° C.: 300–700 cps.
**Mixture of alkylarylsulphonate and polyoxyethylenated triglyceride; vicosity at 25° C.: 1500–1900 cps.

In order to obtain a composition to be sprayed, one mixes this concentrate with water, the quantity of water added being a function of the dose of active material to be used.

Following said procedure, an emulsifiable concentrate of 2 - (2,5' - dichlorophenyl) - 3,3 - dichloropropane-2-ol was obtained.

Study of the pesticidal properties of the compounds I

As has been indicated above, the compounds I possess herbicidal and insecticidal properties.

The herbicidal activity of the compounds I is evidenced by tests on plants representative of the great botanical families.

The insecticidal properties of the compounds I is evidenced by tests on drosophila, cockroach and grain weevil.

Details of these tests are given below.

Study of the herbicidal properties

The tests are effected on the following plants: *Agrostis*, oats, chrysanthemum, flax, mustard, clover, beet, wheat, maize and foxtail grass.

(a) Pre-emergence tests

Sowing is effected in culture vessels with double bottoms for watering from below.

20 seeds are distributed per furrow.

3 furrows are treated with each dose of tested products. Treatment is effected before sowing, by spraying over roller cover, at doses corresponding to 2.5–10.5 kg. of active material per hectare, and at a dilution corresponding to 560 l./ha. One then effects a superficial incorporation of the product by scraping the soil, then one proceeds with sowing.

The seedlings are stored in a room conditioned at 20° C. ± 1° C. in an atmosphere whose relative humidity is comprised between 55% and 65%, lighting being ensured by means of daylight type and brilliant white type fluorescent tubes, from 6 o'clock to 22 hours every day.

The efficacy of the tested compounds is checked by weighing the seedlings, twenty-one days after sowing, in comparison with a non-treated control.

The results are expressed in percentage of reduction of the vegetation.

The percentage of reduction of the vegetation is expressed by the formula:

$$P = 100 \times \frac{\text{Weight of the control seedlings} - \text{weight of the treated seedlings}}{\text{Weight of the control seedlings}}$$

(b) Post-emergence tests

The conditions of the post-emergence tests are analogous to those used for the pre-emergence tests.

Treatment is effected eighteen to nineteen days after sowing and checking is carried out eleven to twelve days after treatment.

(c) Conclusions

The compounds I exhibit a remarkable pre- and post-emergence herbicidal activity on all the plants tested.

Study of the insecticidal activity (a) Test on drosophila (*Drosophila melanogaster*)

This test measures the activity of the tested compounds in the vapor phase. It consists of placing the insects in a Petri dish connected by a tergal veil to a crystallizing dish of the same diameter in which one deposits the compound to be tested in acetonic solution which one evaporates before introduction of the insects. One carries out three tests per concentration and there are 25 insects per Petri dish (adults less than forty-eight hours old). The results are expressed in percentage of mortality (with respect to non-treated controls) after eight hours and after twenty-four hours.

This test on drosophila has shown the very marked action of the compounds I.

(b) Test on cockroach (*Blabera germanica*)

This test is effected by micro-contact. Cockroach larvae chosen according to the criterion of length, receive a micro-dop of acetonic solution between the second and third pair of legs. After treatment, the "test insects" are sorted in shade at 20° C. The countings of dead insects are effected twenty-four hours, forty-eight hours, and five days after treatment.

The compounds I were generally found to be very efficacious against cockroach.

(c) Test on grain weevils (*Sitophilus granarius*)

This test is a test of limited vapor-contact. It consists of placing the insects in a Petri dish, the bottom of which is turned upwards and the interior surface of the bottom of which is powdered with talc. The product is deposited in acetonic solution on the interior surface of the cover. One leaves the acetone to evaporate and introduces twenty-five insects. After one hour, the insects are put into non-treated bottles and are fed. The results are expressed in percentage of mortality. One carries out counting one hour, twenty-four hours and four days after treatment.

The compounds I were found to possess a good efficacy against grain weevils.

Various modifications of the processes, compositions and methods of the invention may be made without departing from the spirit and scope theerof.

We claim:

1. A halogenated compound of the general formula:

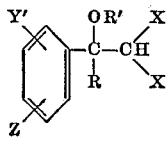

wherein R is selected from the group consisting of a lower alkyl radical and an unsaturated lower alkyl radical, X is selected from the group consisting of a chlorine atom and a bromine atom, Z is selected from the group consisting of a chlorine atom and a bromine atom, Y' is selected from the group consisting of a hydrogen atom, a chlorine atom, a bromide atom, a lower alkyl radical and a nitro group, R' is hydrogen.

2. A halogenated compound of claim 1, of general formula:

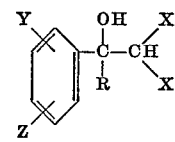

in which R is selected from the group consisting of a lower alkyl radical and an unsaturated lower alkyl radical, X is selected from the group consisting of a chlorine atom and a bromine atom, Y is selected from the group consisting of a hydrogen atom, a chlorine atom and a bromine atom, Z is selected from the group consisting of a chlorine atom and a bromine atom.

3. A compound of claim 1, which is 2-(2',5'-dichlorophenyl)-3,3-dichloropropane-2-ol.

4. A compound of claim 1 which is 2-(p-chlorophenyl)-3,3-dichloropropane-2-ol.

5. A compound of claim 1, which is 2-(p-bromophenyl)-3,3-dichloropropane-2-ol.

6. A compound of claim 1, which is 2-(ortho-bromo phenyl)-3,3-dichloropropane-2-ol.

7. A compound of claim 1, which is 2-(2',4'-dichlorophenyl)-3,3-dichloropropane-2-ol.

8. A compound of claim 1, which is 3-(p-chlorophenyl)-4,4-dichloro-1-butyne-3-ol.

9. A compound of claim 1, which is 3-(2',5'-dichlorophenyl)-4,4-dichloro-1-butyne-3-ol.

10. A compound of claim 1, which is 2-(2'-chloro-5'-methylphenyl)-3,3-dichloropropane-2-ol.

11. A compound of claim 1, which is 2-(2'-methyl-5'-chlorophenyl)-3,3-dichloropropane-2-ol.

12. A compound of claim 1, which is 2-(3'-nitro-4'-chlorophenyl)-3,3-dichloropropane-2-ol.

References Cited

OTHER REFERENCES 717,863     7/1968    Belgium _____ 260—618 D

OTHER REFERENCES

Derwent Belgian Patents Report No. 2/69, 5 General Organic, p. 3, July 10, 1968.

BERNARD HELFIN, Primary Examiner

U.S. Cl. X.R.

260—488 CD, 456 P; 71—103, 106, 122; 424—303, 311, 343